United States Patent
Sikka et al.

(10) Patent No.: US 11,055,555 B2
(45) Date of Patent: Jul. 6, 2021

(54) ZERO-SHOT OBJECT DETECTION

(71) Applicant: SRI International, Menlo Park, CA (US)

(72) Inventors: Karan Sikka, Lawrenceville, NJ (US); Ajay Divakaran, Monmouth Junction, NJ (US); Ankan Bansal, College Park, MD (US)

(73) Assignee: SRI International, Menlo Park, CA (US)

( * ) Notice: Subject to any disclaimer, the term of this patent is extended or adjusted under 35 U.S.C. 154(b) by 182 days.

(21) Appl. No.: 16/383,447

(22) Filed: Apr. 12, 2019

(65) Prior Publication Data

US 2019/0325243 A1    Oct. 24, 2019

Related U.S. Application Data

(60) Provisional application No. 62/660,863, filed on Apr. 20, 2018.

(51) Int. Cl.
| | |
|---|---|
| *G06K 9/46* | (2006.01) |
| *G06K 9/20* | (2006.01) |
| *G06K 9/62* | (2006.01) |
| *G06K 9/32* | (2006.01) |
| *G06K 9/72* | (2006.01) |
| *G06N 20/00* | (2019.01) |
| *G06N 5/04* | (2006.01) |

(52) U.S. Cl.
CPC ......... *G06K 9/2054* (2013.01); *G06K 9/3241* (2013.01); *G06K 9/46* (2013.01); *G06K 9/628* (2013.01); *G06K 9/6215* (2013.01); *G06K 9/6262* (2013.01); *G06K 9/726* (2013.01); *G06N 5/04* (2013.01); *G06N 20/00* (2019.01); *G06K 2009/6213* (2013.01)

(58) Field of Classification Search
CPC ...... G06K 9/3241; G06K 9/46; G06K 9/6215; G06K 9/6262
See application file for complete search history.

(56) References Cited

U.S. PATENT DOCUMENTS

2018/0285696 A1*  10/2018  Eigen ...................... G06T 11/60

* cited by examiner

*Primary Examiner* — Sam Bhattacharya
(74) *Attorney, Agent, or Firm* — Moser Taboada (57) ABSTRACT

A method, apparatus and system for zero shot object detection includes, in a semantic embedding space having embedded object class labels, training the space by embedding extracted features of bounding boxes and object class labels of labeled bounding boxes of known object classes into the space, determining regions in an image having unknown object classes on which to perform object detection as proposed bounding boxes, extracting features of the proposed bounding boxes, projecting the extracted features of the proposed bounding boxes into the space, computing a similarity measure between the projected features of the proposed bounding boxes and the embedded, extracted features of the bounding boxes of the known object classes in the space, and predicting an object class label for proposed bounding boxes by determining a nearest embedded object class label to the projected features of the proposed bounding boxes in the space based on the similarity measures.

7 Claims, 7 Drawing Sheets

ZERO-SHOT OBJECT DETECTION

CROSS-REFERENCE TO RELATED APPLICATIONS

This application claims priority to and the benefit of U.S. Provisional Patent Application Ser. No. 62/660,863, filed Apr. 20, 2018 which is incorporated herein by this reference in its entirety.

GOVERNMENT RIGHTS

This invention was made with Government support under contract no. N00014-17-C-1008 awarded by the Office of Naval Research. The Government has certain rights in this invention.

FIELD

Embodiments of the present principles generally relate to object detection, and more particularly, to methods, apparatuses, and systems for detecting objects and object classes not observed during the training of a detector.

BACKGROUND

Object classification aims to predict the presence or absence of an object in an image. In contrast, object detection aims at predicting bounding box locations for objects in an image. While object classification can rely heavily on contextual cues in an image, for example an airplane co-occurring with clouds, object detection needs to exactly localize an object of interest and can potentially be degraded by contextual correlations. Furthermore, object detection requires learning additional invariance to appearance, occlusion, viewpoint, aspect ratio, etc. in order to precisely delineate a bounding box for the object.

Compared to fully supervised object detection, zero-shot detection has many differences and additional challenges. While in the fully supervised case a background object class is added to better discriminate between objects (e.g. car, person) and backgrounds (e.g. sky. wall, road), the meaning of "background" is not clear for zero-shot detection. More specifically, for zero-shot detection, the identification of a background can include both background "stuff" as well as objects from unseen object classes. This leads to non-trivial practical problems for zero-shot detection.

SUMMARY

Embodiments of methods, apparatuses and systems for zero-shot object detection are disclosed herein.

In some embodiments in accordance with the present principles, a method of creating a semantic embedding space for improved zero-shot object detection includes, for each of a plurality of known object class labels, creating a respective, first word vector representative of each of the object class labels, for each of a plurality of object bounding boxes, extracting features of an object bounding box, for each of the extracted features of each of the object bounding boxes, creating a respective feature vector representative of the extracted features, for each of the plurality of object bounding boxes, creating a respective, second word vector representative of an object class label associated with each of the plurality of object bounding boxes, and semantically embedding the respective, first word vectors, the respective, second word vectors, and the respective feature vectors in a common geometric embedding space such that distances between the features vectors and the word vectors embedded in the semantic space follow semantic relationships between words representative of extracted features of object bounding boxes and words representative of object class labels, wherein embedded vectors that are related are closer together in the geometric embedding space than unrelated vectors.

Once a semantic embedding space has been created and trained in accordance with the present principles, a method for zero-shot object detection includes determining a region in an image having an unknown object class on which to perform an object detection as a proposed object bounding box, extracting features of the proposed object bounding box, projecting the extracted features of the proposed object bounding box of the image into the geometric embedding space, computing a similarity measure between the projected features of the proposed object bounding box and the embedded features of at least one of the object bounding boxes in the geometric embedding space, and predicting an object class label for the proposed object bounding box by determining a nearest embedded object class label to the projected features of the proposed object bounding box in the geometric embedding space based on the similarity measures computed for the projected features of the proposed object bounding box.

In some embodiments, an apparatus to create a semantic embedding space for improved zero-shot object detection includes a feature extraction module configured to, for each of a plurality of object bounding boxes, extract features of an object bounding box, and a semantic space generator module configured to, for each of a plurality of known object class labels, create a respective, first word vector representative of each of the object class labels, for each of the extracted features of each of the object bounding boxes, create a respective feature vector representative of the extracted features, for each of the plurality of object bounding boxes, create a respective, second word vector representative of an object class label associated with each of the plurality of object bounding boxes, and semantically embed the respective, first word vectors, the respective, second word vectors, and the respective feature vectors in a common geometric embedding space such that distances between the features vectors and the word vectors embedded in the semantic space follow semantic relationships between words representative of extracted features of object bounding boxes and words representative of object class labels In some embodiments, the apparatus further includes a bounding box proposal module configured to determine a region of interest in an image as a proposed object bounding box. In some embodiments, for performing zero shot object detection, in the apparatus, the bounding box proposal module is further configured to determine a region in an image having an unknown object class on which to perform an object detection as a proposed object bounding box, the feature extraction module is further configured to extract features of the proposed object bounding box, and the semantic space generator module is further configured to project the extracted features of the proposed object bounding box of the image into the geometric embedding space, compute a similarity measure between the projected features of the proposed object bounding box and the embedded features of at least one of the object bounding boxes in the geometric embedding space, and predict an object class label for the proposed object bounding box by determining a nearest embedded object class label to the projected features of the proposed object bounding box in the geometric embedding space based on the similarity measures computed for the projected features of the proposed object bounding box.

In some embodiments in accordance with the present principles, a method for zero shot object detection includes determining a background object bounding box having a respective background object class label in at least one image used to train a semantic embedding space, extracting features of the background object bounding box, extracting features of foreground object bounding boxes in the images used to train the semantic embedding space, the foreground object bounding boxes each having at least one respective foreground object class label, associatively embedding the extracted features of the foreground object bounding boxes and the at least one respective foreground object class label for each of the foreground object bounding boxes and the extracted features of the background object bounding box and the respective background object class label for the background object bounding box into the semantic embedding space having embedded therein pre-trained, foreground object class labels, determining at least one region of interest in an image having an unknown object class on which to perform an object detection as a proposed object bounding box, extracting features of the proposed object bounding box, projecting the extracted features of the proposed object bounding box into the semantic embedding space, computing a similarity measure between the projected features of the proposed object bounding box and the embedded features of at least one of the embedded foreground object bounding boxes and the embedded background object bounding box in the semantic embedding space, and predicting an object class label for the proposed object bounding box by determining at least one of a nearest foreground object class and a nearest background object class to the projected features of the proposed object bounding box in the semantic embedding space based on the similarity measure computed for the projected features of the proposed object bounding box.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for zero-shot object detection. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to particular embedding and feature detection techniques, such teachings should not be considered limiting. Embodiments in accordance with the present principles can be implemented using other embedding and feature detection techniques within the concepts of the present principles.

Embodiments in accordance with the present principles provide methods, apparatuses and systems for zero-shot detection of objects. In some embodiments in accordance with the present principles, semantic embedding of text, images and/or text and images is implemented to capture relationships between seen and unseen object classes to enable zero-shot detection of objects. That is, words representative of images and text are embedded in a semantic space such that the distances between the words in the semantic space follow semantic relationships between the words representative of the images and the text. The embedded relationships of the semantic space are then used to determine class labels for unseen object classes as described in greater detail below.

Advantageously, in accordance with the present principles, classes of unseen objects can be determined without the need for training any of the unseen object classes. In addition, in accordance with present principles, background classes are defined to enable more accurate detection of objects and classes for unseen object classes.

In some embodiments, a set of all object classes can be denoted as $C=S \cup \mathcal{U} \cup \mathcal{O}$, where S denotes the set of known/seen (training) foreground object classes, $\mathcal{U}$ denotes the set of unknown/unseen (test) object classes, and $\mathcal{O}$ denotes the set of classes that are neither part of the seen or the unseen classes (i.e., background classes). Initially, a geometric space, such as a semantic embedding space, is built by embedding a plurality of words, including object class labels, into the semantic embedding space. That is, respective word vectors for each of the known class labels can be created and embedded into the semantic embedding space. In some embodiments, the semantic embedding space can be built using pre-trained word embedding models such as GloVe or fastText.

For training the semantic embedding space, labeled bounding boxes of known/seen object classes as well as corresponding class labels of the bounding boxes are implemented. That is, in some embodiments, features of objects in provided/proposed labeled bounding boxes are extracted and embedded into the semantic embedding space along with a respective class label representative of the features of the bounding box. The features of the labeled labeled bounding boxes can be provided with the labeled bounding boxes or alternatively, or in addition, the features of the provided labeled bounding boxes can be extracted using extraction algorithms (described in further detail below).

The training/embedding in accordance with embodiments of the present principles described herein creates a common semantic embedding space that aligns object features of bounding boxes with respective object class label embeddings using paired training embeddings. In such embodiments, an image can be denoted as $I \in \mathbb{R}^{M \times N \times 3}$, a provided bounding box can be denoted as $b_i \in \mathbb{N}^4$ and the associated object class labels can be denoted as $y_i \in S$. A semantic embedding for different object class labels can be denoted as $w_j \in \mathbb{R}^{D_2}$. It should be noted that a common semantic embedding space in accordance with the present principles can be trained using foreground object bounding boxes and respective foreground object class labels, background object bounding boxes and respective background object class labels, and/or any combination.

In some embodiments in accordance with the present principles, to avoid a sparse sampling of the semantic embedding space during training, additional data from external sources that include object bounding boxes with features belonging to object classes not necessarily available in popular training datasets are implemented to train the semantic embedding space to produce a dense object class sampling in the semantic embedding space. In some embodiments, datasets such as the Microsoft common objects in context (COCO) dataset, the VisualGenome dataset and the Openimages dataset can be used for providing labeled bounding boxes, including object features and class labels, for training a semantic embedding space in accordance with the present principles.

Alternatively, regions of interest can be identified in, for example, an image of a training dataset as proposed object bounding boxes. In some embodiments in accordance with the present principles, an arbitrary region proposal method can be used to propose regions of interest, as object bounding boxes, in subject image(s) used for training the semantic embedding space.

Features, such as deep features, of at least some of the known labeled bounding boxes from the training datasets and the proposed bounding boxes can then be extracted using, for example, a convolutional neural network (CNN). The extracted features for each bounding box, $b_i$, can be denoted as $\phi(b_i) \in \mathbb{R}^{D_1}$. A respective feature vector can then be created for the extracted bounding box features. In addition, a respective second word vector can be created for each of the respective class labels of the object bounding boxes.

The first word vectors representative of the known object class labels, the feature vectors representative of the features of the object bounding boxes, and the second word vectors representative of the respective class labels of the object bonding boxes can then be semantically embedded in the semantic embedding space such that distances between the features vectors and the word vectors embedded in the semantic space follow semantic relationships between words representative of extracted features of object bounding boxes and words representative of object class labels. In the semantic embedding space, embedded vectors that are related are closer together in the geometric embedding space than unrelated vectors.

Once the semantic embedding space is trained as described above, zero-shot object detection in accordance with the present principles can be performed. For example, in some embodiments, a region of interest in an image having an unknown object class on which to perform object detection can be determined as a proposed object bounding box. As described above, an arbitrary region proposal method can be used to propose regions of interest, as object bounding boxes, in a subject image. Features of the proposed object bounding box can then be extracted as described above. In some embodiments in accordance with the present principles, the extracted features of the proposed bounding boxes can be projected into the trained semantic embedding space. In some embodiments, the features of the proposed bounding boxes are projected into the semantic embedding space via a neural network using, for example, a linear projection technique according to equation one (1), which follows:

$$\psi_i = W_p(b_i), \quad (1)$$

where $W_p \in \mathbb{R}^{D_2 \times D_1}$ is a projection matrix, and $\psi_i$ is the projected feature.

The trained semantic embedding space can be used to compute a similarity measure between a projected bounding box feature, $\psi_i$, of the proposed bounding box and an object class embedding (i.e., embedded features of an object bounding box), $w_j$, for an object class label, $y_i$. In some embodiments in accordance with the present principles, the similarity measure is computed as a cosine similarity, $S_{ij}$, between at least two vectors. An object class, $\hat{y}_i$, for extracted features of a proposed bounding box, $b_i$, can be predicted by finding a nearest embedded object class label based on a determined similarity score determined between the extracted features of the proposed bounding box and embedded object class labels corresponding to features of bounding boxes used to train the semantic embedding space. In some embodiments, an object class label can be predicted for objects in a proposed bounding box of a subject image according to equation three (3), which follows:

$$\hat{y}_i = \mathrm{argmax}\, S_{ij}. \quad (3)$$

In some embodiments, a projection can be learned by using a max-margin loss technique, which enforces the constraint that the matching score of an extracted feature of an object bounding box with a true object class should be higher than the matching score of an extracted feature of a bounding box with other object classes.

In some embodiments in accordance with the present principles, a loss for an extracted feature of a bounding box, $b_j$, used for training the semantic embedding space having an object class label, $y_i$, can optionally be defined according to equation two (2), which follows:

$$\mathcal{L}_{(b_j, y_i, \theta)} = \Sigma_{j \in s, j \neq i} \max(0, m - S_{ii} + S_{ij}),  \quad (2)$$

where $\theta$ denotes the parameters of an algorithm used to extract the deep features of a bounding box (i.e., a deep convolutional neural network (CNN)) and the projection matrix, and m is the margin.

Further, in some embodiments in accordance with the present principles, an additional reconstruction loss can be optionally added to the loss, $\mathcal{L}$, for an extracted feature of a bounding box, $b_j$, used for training the semantic embedding space to regularize embeddings in the semantic embedding space. In particular, in some embodiments in accordance with the present principles, the projected bounding box features are used to reconstruct the original deep features and a reconstruction loss is calculated as a squared (L2) distance between the reconstructed feature and the original deep feature.

In some embodiments in accordance with the present principles, a background object class can be embedded in the semantic embedding space during training of the semantic embedding space. That is, in one embodiment a fixed vector is added for the background class in the semantic embedding space to assist in identifying background classes. Such 'statically-assigned' background modeling provides a process for incorporating background information. In such embodiments implementing 'statically-assigned' background modeling, a single vector embedded in the semantic embedding space represents one monolithic background class for the entire semantic embedding space.

Alternatively or in addition, in some embodiments in accordance with the present principles, background bounding boxes can be located throughout the semantic embedding space by assigning proposed bounding boxes of a training dataset that contain neither seen nor unseen objects as background bounding boxes, including respective labels for the background bounding boxes. That is, background object bounding boxes and associated class labels can be created for random images of a dataset used to train the semantic embedding space. For example, in some embodiments in accordance with the present principles, object bounding boxes having background object classes can be proposed for images of a dataset used to train the semantic embedding space. In some embodiments, to overcome deficiencies associated with having one monolithic background object class for the entire semantic embedding space, at least two background object bounding boxes having at least two different associated background object classes are proposed.

In some embodiments, because a majority of the object bounding box proposals of a training dataset belong to the 'background' object class, only a few of the background bounding boxes are selected for training the embedded semantic space. In one embodiment, any proposal with 0<IoU<0.2 with a ground truth bounding box can be assigned as a background object bounding box. As such, multiple (latent) object classes are assigned to the background objects, thus covering a wider range of visual concepts for background classes in a trained semantic embedding space. In some embodiments in accordance with the present principles, an Expectation Maximization (EM)-like algorithm can be implemented to spread the background boxes over the embedding space as described above.

As described above with respect to features of foreground object bounding boxes, features of the background object bounding boxes can then be extracted. The extracted features of the background object bounding boxes and respective object class labels for the background object bounding boxes are embedded into the semantic embedding space for training the semantic embedding space to associate the background features with the corresponding background object class labels. The implementation of background object bounding boxes for defining background objects/object classes in accordance with embodiments of the present principles prevents the identification of background objects/object classes as unseen/unknown object classes in, for example, the proposed object bounding boxes described above.

Various embodiments described herein use a common embedding space that aligns object features with class label embeddings by using paired training examples. A practical problem in learning such a model with small datasets is that there are only a small number of seen classes, which results in a sparse sampling of the embedding space during training. This can be problematic particularly for recognizing unseen classes which, by definition, lie in parts of the embedding space that do not have training examples. As a result, in some instances the method may not converge towards the right alignment between the object features (visual/feature vectors) and the class labels (word vectors). To alleviate the possibility of misalignment, in some embodiments, the semantic embedding space in accordance with the present principles can be trained with additional data from external sources that contain object bounding boxes and features belonging to classes other than unseen classes to have a dense sampling of the space of object classes during training of the semantic embedding space to improve the alignment of the vectors.

For example, in one embodiment in accordance with the present principles, Openimages (OI), a large-scale dataset from Google, can be used for densely sampling the semantic embedding space during training, which will be described in greater detail below. Openimages contains about 1.5 million images containing 3.7 million bounding boxes that span 545 object categories.

Figure 1:
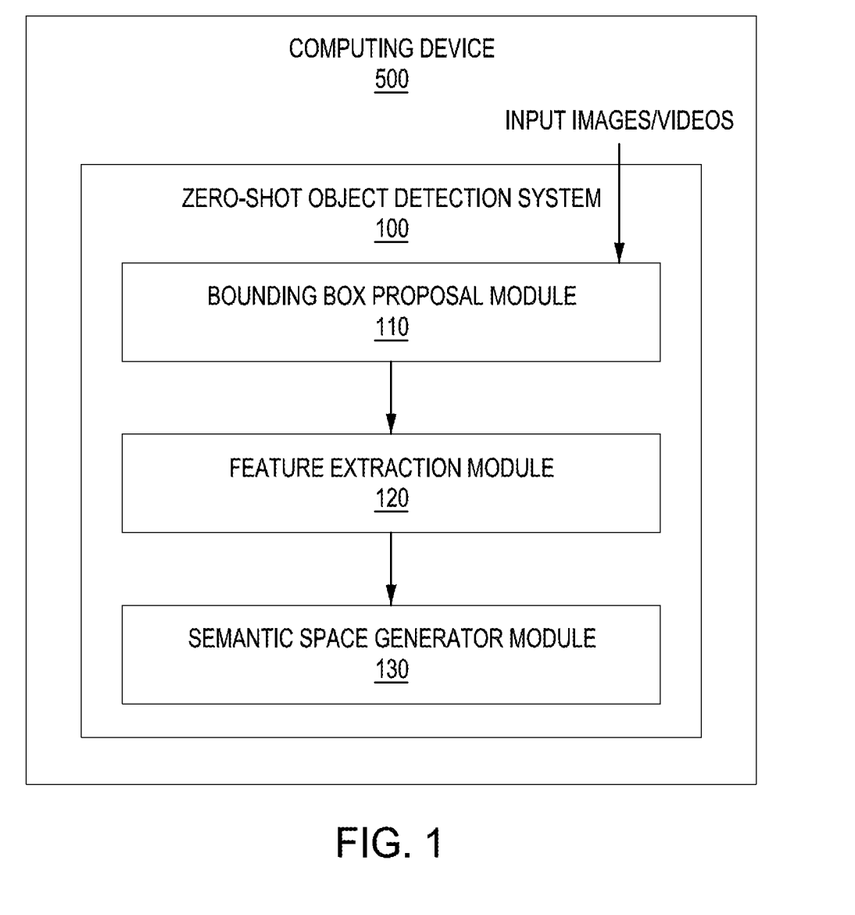
FIG. 1 depicts a high level block diagram of a zero-shot object detection system in accordance with an embodiment of the present principles.

FIG. 1 depicts a high level block diagram of a zero-shot object detection system 100 in accordance with an embodiment of the present principles. The zero-shot object detection system 100 of FIG. 1 illustratively comprises a bounding box proposal module 110, a feature extraction module 120, and a semantic space generator module 130.

As depicted in FIG. 1, embodiments of a zero-shot object detection system can be implemented in a computing device 500 (described in greater detail in FIG. 5) in accordance with the present principles. That is, in some embodiments, images and videos that can be used to train a semantic space in accordance with the present principles can be received by the zero-shot object detection system 100 from the computing device 500. In addition, images and videos for which object detection is to be performed upon by a zero-shot object detection system, such as the zero-shot object detection system 100 of FIG. 1 in accordance with embodiments of the present principles, can be received by the zero-shot object detection system 100 from the computing device 500. Results of the zero-shot object detection can be presented to a user using an output device of the computing device 500, such as a display, a printer or any other form of output device.

The operation of the zero-shot object detection system 100 of FIG. 1 and the above-described illustrative components will now be described with respect to an operational embodiment. In an operational embodiment, two datasets, Microsoft common objects in context (MSCOCO) and VisualGenome, were implemented as data inputs to the zero-shot object detection system 100. To begin, class labels of the MSCOCO and VisualGenome datasets were communicated to the semantic space generator module 130 at which word-vector embeddings in a semantic embedding space were created for all object classes of the datasets.

In the described embodiment, the object classes were clustered into K clusters using a cosine-distance between the word-vectors as the distance metric. 80% of the classes from each cluster were randomly selected and assigned to the training dataset (seen classes). The remaining 20% of classes from each cluster were assigned as the test dataset (unseen classes). In an experimental embodiment, for the MSCOCO dataset, the classes were clustered into K=10 clusters including 48 training classes and 17 test classes and for the VisualGenome dataset, the classes were clustered into K=20 clusters including 478 training classes and 130 test classes.

In the operational embodiment, a training dataset from the MSCOCO dataset and the VisualGenome dataset were communicated to the bounding box proposal module 110 of the zero-shot object detection system 100 of FIG. 1. In the bounding box proposal module 110, bounding box proposals were obtained for each image in the training set using a regional proposal method, for example in one embodiment, Edge Boxes. Each bounding box proposal in the training set was assigned either a 'seen object' class or 'background object' class. Since, the majority of the bounding box proposals belonged to the 'background object' class, only a few of the background bounding boxes were included for training the semantic embedding space. That is, in some embodiments, any proposal with 0<IoU<0.2 with a ground truth bounding box are assigned as a background object bounding box by the bounding box proposal module 110. Apart from the selected background object bounding boxes, a few more randomly selected background object bounding boxes were also included for training the semantic embedding space. For the MSCOCO dataset, to avoid assigning unseen categories as background boxes, all images from the training set which contained any of the unseen categories were removed from the training dataset by the bounding box proposal module 110. Such removal was not able to be performed for the VisualGenome dataset because the images in VisualGenome are very densely labeled and such removal process would eliminate most of the training images.

For each 'seen object' class bounding box proposal, if the object bounding box proposal had an intersection-over-union (IoU) greater than 0.5 with a ground truth box, the seen object bounding box was assigned the object class label of the ground-truth box by the bounding box proposal module 110. Each ground truth bounding box is capable of generating several object bounding boxes for training the semantic embedding space.

Alternatively or in addition, in some embodiments, the datasets, e.g., the MSCOCO and the VisualGenome datasets, can contain images that include object bounding boxes, which include features. Such object bounding box information can be used by the zero-shot object detection system 100 of FIG. 1 as described below.

Referring back to the zero-shot object detection system 100 of FIG. 1, the feature extraction module 120 used a convolution neural network (CNN) to extract features of the objects in the known and proposed object bounding boxes (i.e., both the 'seen object' bounding boxes and the 'background object' bounding boxes). That is, in the described embodiment, the feature extraction module 120 used a (pre-trained) Inception-ResNet v2 model as a base CNN for computing deep features of the objects of all bounding boxes.

For example, in one embodiment $\{x_i, y_i\}_{i=1, \ldots, n}$ was used to represent the training set, where $x_i$ represents an object bounding box, such as an object bounding box proposal, and $y_i$ represents the corresponding word, class label. Each of the object proposals, $x_i$, was operated on by a CNN (Inception ResNet-v2) to extract features of the objects of the object bounding box. The final 1×1 convolution layer was connected to a fully connected layer of the same dimension as the semantic embedding space.

Referring back to the zero-shot object detection system 100 of FIG. 1, in the operational embodiment, the semantic space generator module 130 created vector representations of the output of the fully connected layer (i.e., the extracted features of the objects) and the associated class label(s). That is, the semantic space generator module 130 created a feature vector representation for the extracted features of each of the object bounding boxes and created a word vector representation for each of the respective object class labels associated with each of the object bounding boxes.

The semantic space generator module 130 then embedded the created feature vectors and the word vectors into the semantic embedding space. For example, let zi represent the output of the fully connected layer. The parameters of the CNN and the fully connected layer were embedded by the semantic space generator module 130 into the semantic embedding space using a Stochastic gradient descent (SGD) method having a loss function as the cosine distance between zi and the class label word vec(yi). The described arrangement forces the visual embedding feature vector, zi, to lie close to the class lablel word-vector, word vec(yi), in the same semantic embedding space. This ensures that semantically similar vectors lie close in the embedding space and dissimilar vectors are far apart.

As described above, to increase the class label density in the semantic embedding space, in one embodiment the semantic embedding space was trained using additional data from the OI dataset. Before training the semantic embedding space with the OI dataset, all of the object classes to be used as test classes were removed from the OI dataset. This led to an addition of 238 object classes to the VG dataset and to an additional 330 classes for MSCOCO dataset during the training of the semantic embedding space. This increased the number of training bounding boxes for the VG dataset to 3.3 million and increased the number of training bounding boxes for the MSCOCO dataset to 1 million. The semantic embedding space was as such trained as described above.

To evaluate an embodiment of zero-shot detection in accordance with the present principles, images of the unseen object classes from the VG dataset and the MSCOCO dataset were communicated to the bounding box proposal module 110 of the zero-shot object detection system 100 of FIG. 1. At the bounding box proposal module 110, an object bounding box was proposed for an unseen test image of one of the datasets using an Edge-Box method. In the zero-shot object detection system 100 of FIG. 1, features of the proposed object bounding box were extracted at the feature extraction module 120 using a CNN. The extracted features of the proposed object bounding box of the unseen test image were projected by the semantic space generator module 130 into the trained semantic space as described above and, for example, in one embodiment using a linear projection.

The semantic space generator module 130 computed a similarity measure between the projected features of the proposed object bounding box and the embedded features of the object bounding boxes in the geometric embedding space. The semantic space generator module 130 predicted an object class label for the proposed object bounding box by determining a nearest embedded object class label to the projected features of the proposed object bounding box in the geometric embedding space based on the similarity measures computed for the projected features of the proposed object bounding box.

The inventors determined that zero-shot object detection in accordance with the present principles performs better when the semantic embedding space is densely trained with class labels as described above. In addition, the inventors determined that zero-shot object detection in accordance with the present principles performs better when background classes and associated features of respective background object bounding boxes are assigned throughout the semantic embedding space than when a fixed, single vector is added for the background class in the semantic embedding space.

Figure 2:
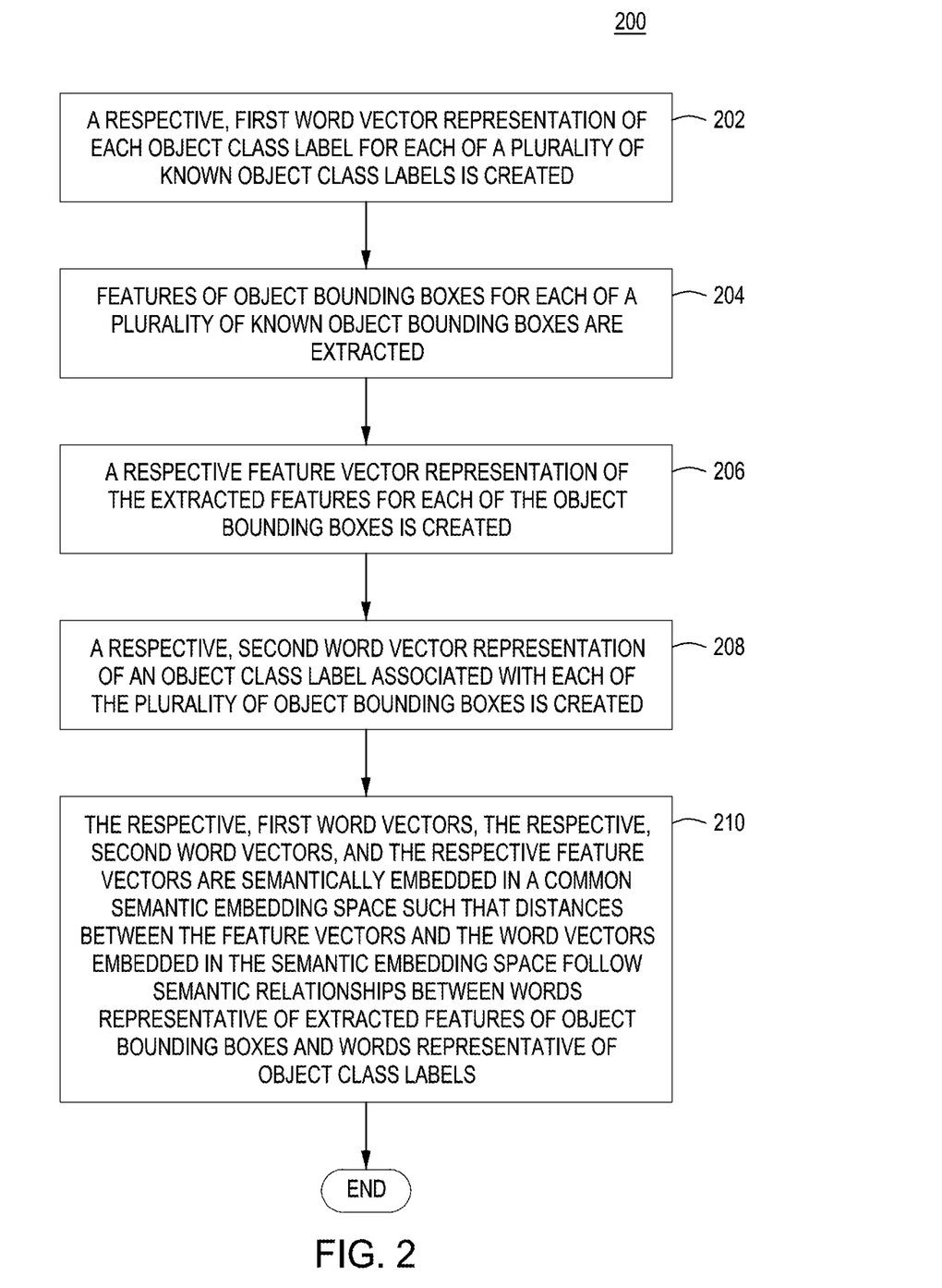
FIG. 2 depicts a flow diagram of a method for zero-shot object detection in accordance with an embodiment of the present principles.

FIG. 2 depicts a flow diagram 200 of a method of creating a semantic embedding space for improved zero-shot object detection in accordance with an embodiment of the present principles. The method 200 begins at 202 during which first word vectors are created for a plurality of known object class labels to be used to train a common geometric space, such as a common semantic embedding space. For example, as described above, in one embodiment class labels of the MSCOCO and VisualGenome datasets are communicated to the semantic space generator module 130 at which respective first word-vector(s) can be created for all object classes of the datasets. The method 200 can proceed to 204.

At 204, features of object bounding boxes are extracted. For example, as described above, in one embodiment a training dataset from the MSCOCO dataset and the VisualGenome dataset can be communicated to the bounding box proposal module 110 of the zero-shot object detection system 100 at which bounding box proposals can be obtained for each image in the training set using a regional proposal method, for example in one embodiment, Edge Boxes. Alternatively or in addition, images of the MSCOCO dataset and the VisualGenome dataset can contain known object bounding boxes including features. At the feature extraction module 120, a convolution neural network (CNN) can be used to extract features of the objects in the known and proposed object bounding boxes for, for example, both the 'seen object (foreground)' bounding boxes and the 'background object' bounding boxes (described in greater detail below with respect to FIG. 7). The method 200 can proceed to 206.

At 206, a respective feature vector is created representative of the extracted features of each of the object bounding boxes. For example, as described above, in one embodiment the semantic space generator module 130 can create a feature vector representation for each of the extracted features of each of the object bounding boxes. The method 200 can proceed to 208.

At 208, a respective second word vector is created representative of an object class label associated with each of the object bounding boxes. For example, as described above, in one embodiment the semantic space generator module 130 can create a second word vector representation for each of the respective class labels associated with each of the object bounding boxes. The method 200 can proceed to 210.

At 210, the respective, first word vectors, the respective, second word vectors, and the respective feature vectors are semantically embedded in a common geometric embedding space such that distances between the features vectors and the word vectors embedded in the semantic space follow semantic relationships between words representative of extracted features of object bounding boxes and words representative of object class labels. The method 200 for creating and training the semantic embedding space in accordance with the embodiment of FIG. 2 can be exited.

Figure 6:
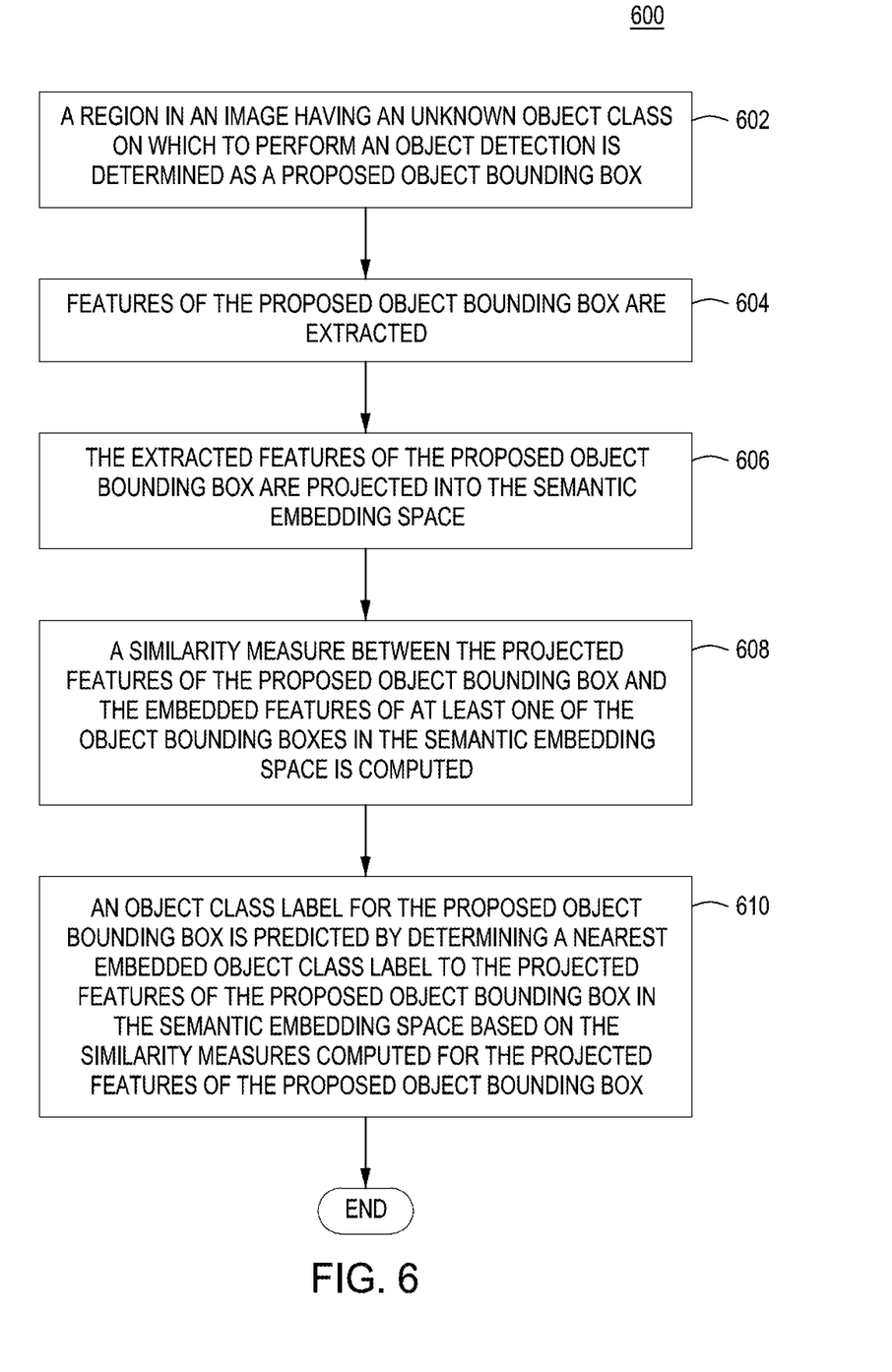
FIG. 6 depicts a flow diagram of a method for performing zero-shot object detection using a trained common semantic embedding space in accordance with an embodiment of the present principles.

Once the semantic embedding space has been created and trained in accordance with the present principles, zero-shot object detection can be performed in accordance with a method 600 of FIG. 6 in accordance with an embodiment of the present principles. That is, FIG. 6 depicts a flow diagram of a method 600 for performing zero-shot object detection using a common semantic embedding space trained in accordance with an embodiment of the present principles, such as the embodiment 200 of FIG. 2.

The method 600 begins at 602 during which a region in an image having an unknown object class on which to perform an object detection is determined as a proposed object bounding box. For example, as described above, in one embodiment images having an unseen object classes can be communicated to the bounding box proposal module 110 of the zero-shot object detection system 100 of FIG. 1. At the bounding box proposal module 110, an object bounding box can be proposed for an image having at least one unseen object class using, for example, an Edge-Box method. The method 600 can proceed to 604.

At 604, features of the proposed object bounding are extracted. For example, as described above, in one embodiment features of the proposed object bounding box can be extracted at the feature extraction module 120 of the zero-shot object detection system 100 of FIG. 1 using a CNN. The method 600 can proceed to 606.

At 606, the extracted features of the proposed object bounding box are projected into the semantic embedding space. For example, as described above, in one embodiment the extracted features of the proposed object bounding box can be projected into the trained semantic space by the semantic space generator module 130 of the zero-shot object detection system 100 of FIG. 1 using a linear projection. The method 600 can proceed to 608.

At 608, a similarity measure between the projected features of the proposed object bounding box and the embedded features of at least one of the object bounding boxes in the semantic embedding space is computed. For example, as described above, in one embodiment the semantic space generator module 130 of the zero-shot object detection system 100 of FIG. 1 can compute a cosine similarity measure between the projected features of the proposed object bounding box and the embedded features of the object bounding boxes in the geometric embedding space. The method 600 can proceed to 610.

At 610, an object class label for the proposed object bounding box is predicted by determining a nearest embedded object class label to the projected features of the proposed object bounding box in the semantic embedding space based on the similarity measures computed for the projected features of the proposed object bounding box. For example, as described above, in one embodiment the semantic space generator module 130 of the zero-shot object detection system 100 of FIG. 1 can predict an object class label for the proposed object bounding box by determining a nearest embedded object class label to the projected features of the proposed object bounding box in the geometric embedding space based on the similarity measures computed for the projected features of the proposed object bounding box. The method 600 can be exited.

Figure 7A:
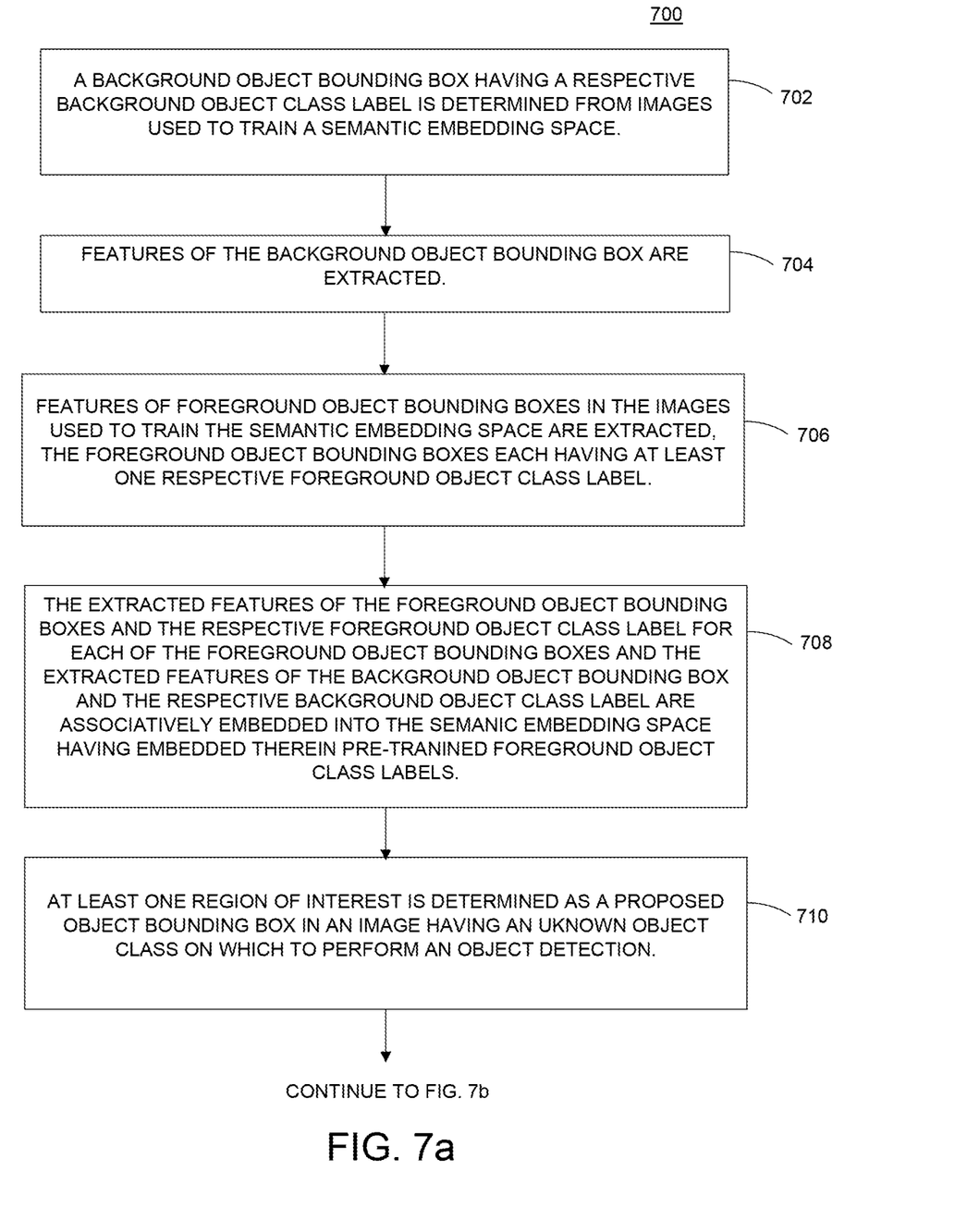
FIG. 7a depicts a flow diagram of an embodiment of a method for zero shot object detection including a semantic embedding space trained using at least two background object classes in accordance with an embodiment of the present principles.
Figure 7B:
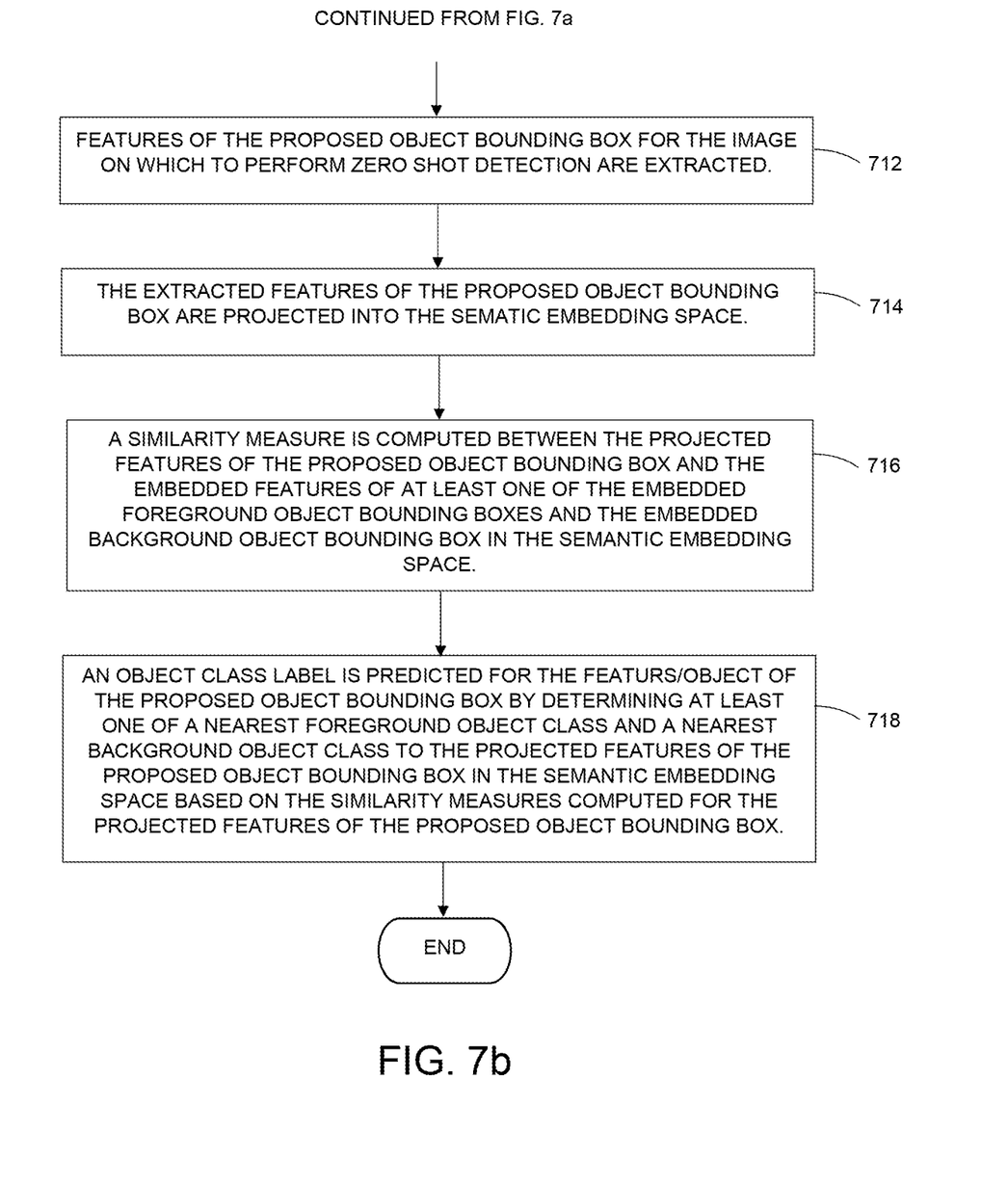
FIG. 7b depicts a flow diagram of an embodiment of a method for zero shot object detection including a semantic embedding space trained using at least two background object classes in accordance with an embodiment of the present principles.

As described above, in some embodiments in accordance with the present principles, background object feature bounding boxes and corresponding object class labels are used for training a semantic embedding space of the present principles. The semantic embedding space trained with the background object feature bounding boxes and corresponding object class labels can then be used for performing zero shot object detection in accordance with embodiments of the present principles. For example, FIGS. 7a and 7b depict a flow diagram of an embodiment of a method for zero shot object detection including a semantic embedding space trained using at least two background object classes. The method 700 begins at 702 during which a background object bounding box having a respective background object class label is determined from images used to train a semantic embedding space. The method 700 can proceed to 704.

At 704, features of the background object bounding box are extracted. The method 700 can proceed to 706.

At 706, features of foreground object bounding boxes in the images used to train the semantic embedding space are extracted, the foreground object bounding boxes each having at least one respective foreground object class label. The method 700 can proceed to 708.

At 708, the extracted features of the foreground object bounding boxes and the at least one respective foreground object class label for each of the foreground object bounding boxes and the extracted features of the background object bounding box and the respective background object class label for background object bounding box are associatively embedded into the semantic embedding space having embedded therein pre-trained, foreground object class labels. The method 700 can proceed to 710.

At 710, at least one region of interest is determined as a proposed object bounding box in an image having an unknown object class on which to perform an object detection in accordance with embodiments of the present principles. The method 700 can proceed to 712.

At 712, features of the proposed object bounding box for the image on which to perform the zero shot detection are extracted. The method 700 can proceed to 714.

At 714, the extracted features of the proposed object bounding box are projected into the semantic embedding space. The method 700 can proceed to 716.

At 716, a similarity measure is computed between the projected features of the proposed object bounding box and the embedded features of at least one of the embedded foreground object bounding boxes and the embedded background object bounding box in the semantic embedding space. The method 700 can proceed to 718.

At 718, an object class label is predicted for the features/object of the proposed object bounding box by determining at least one of a nearest foreground object class and a nearest background object class to the projected features of the proposed object bounding box in the semantic embedding space based on the similarity measure computed for the projected features of the proposed object bounding box. The method 700 can be exited.

Figure 3:
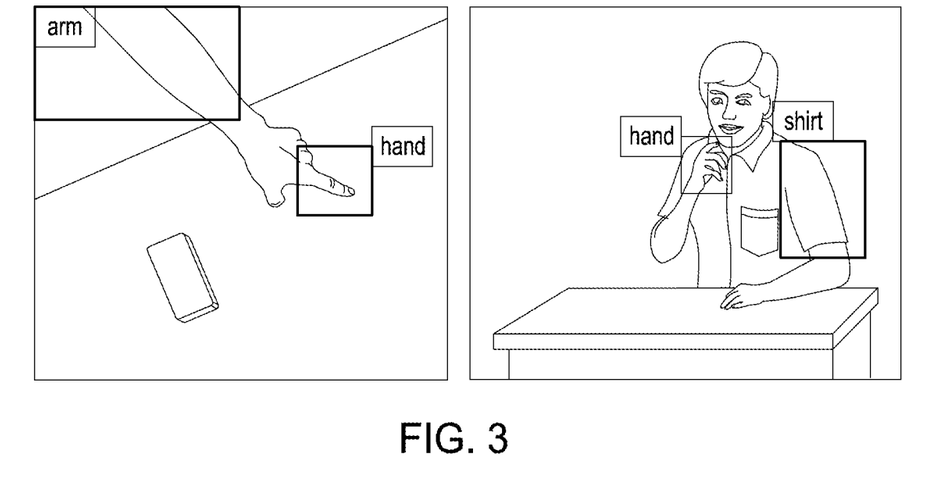
FIG. 3 pictorially depicts two images including labeled bounding boxes used for training a semantic embedding space in accordance an embodiment of the present principles.

FIG. 3 pictorially depicts two images including labeled bounding boxes used for training a semantic embedding space in accordance with the principles described herein. In FIG. 3, an image on the left comprises a bounding box including an object class label of "arm" and an image on the right comprises a first bounding box labeled "hand" and a second bounding box labeled "shirt". In the embodiment of FIG. 3, a semantic embedding space is trained using the features of the labeled bounding boxes. The features of the labeled bounding boxes and the labels are embedded in the semantic embedding space as described above.

Figure 4:
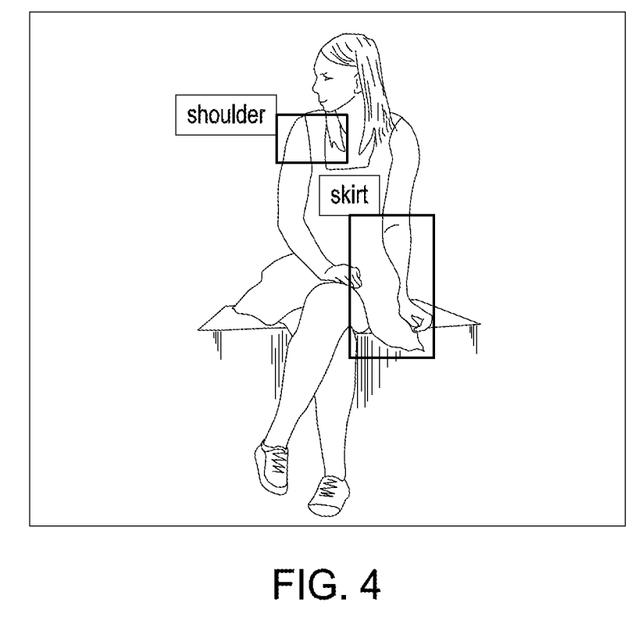
FIG. 4 pictorially depicts an image in which two bounding boxes having objects of interest are proposed and class labels are predicted for the bounding boxes in accordance with an embodiment of the present principles.

FIG. 4 pictorially depicts an image in which two bounding boxes having objects of interest are proposed in accordance with an embodiment of the present principles. In the image of FIG. 4, the label "shoulder" for the first proposed bounding box and the label "skirt" for the second proposed bounding box are determined in accordance with embodiments of the present principles. That is, in the embodiment of FIG. 4, respective features of the first proposed bounding box and the second bounding box are extracted as described above and in accordance with the present principles. The respective, extracted features of the first proposed bounding box and the second proposed bounding box are projected into the semantic embedding space as described above and in accordance with the present principles. In FIG. 4, the object class label "shoulder" for the first proposed bounding box is an object class label embedded in the semantic space nearest the embedding of the features of the first proposed bounding box. Similarly, in FIG. 4, the object class label "skirt" for the second proposed bounding box is an object class label embedded in the semantic space nearest the embedding of the features of the second proposed bounding box.

Figure 5:
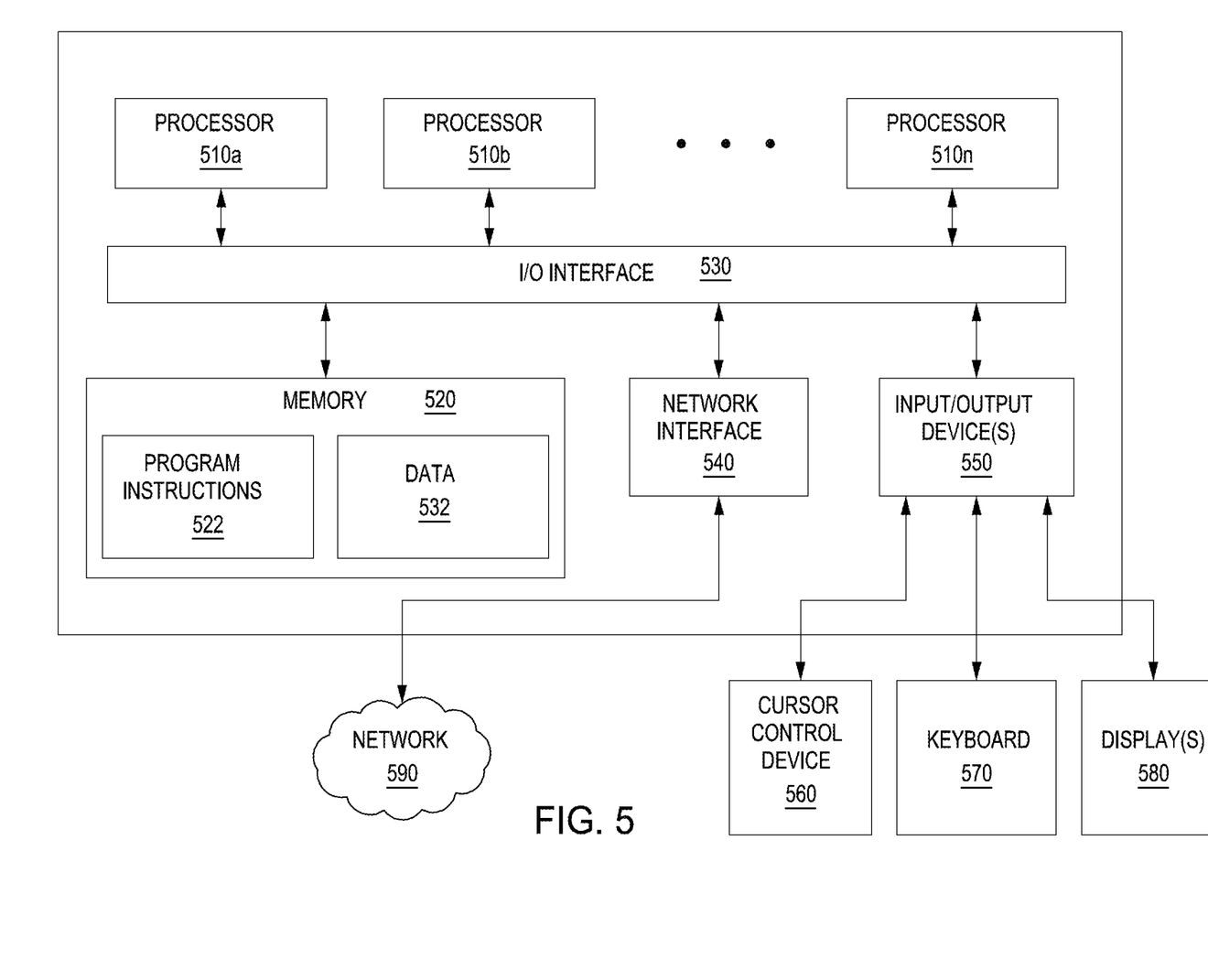
FIG. 5 depicts a high level block diagram of a computing device for implementing embodiments of a zero shot object detection system in accordance with embodiments of the present principles.

FIG. 5 depicts a high level block diagram of a computing device 500 for implementing embodiments of a zero shot object detection system in accordance with embodiments of the present principles. In some embodiments computing device 500 can be configured to implement methods of the present principles, such as at least the methods 200, 600 and 700, as processor-executable executable program instructions 522 (e.g., program instructions executable by processor(s) 510) in various embodiments.

In the embodiment of FIG. 5, computing device 500 includes one or more processors 510a-510n coupled to a system memory 520 via an input/output (I/O) interface 530. Computing device 500 further includes a network interface 540 coupled to I/O interface 530, and one or more input/output devices 550, such as cursor control device 560, keyboard 570, and display(s) 580. In various embodiments, any of the components can be utilized by the system to receive user input described above. In various embodiments, a user interface can be generated and displayed on display 580. In some cases, it is contemplated that embodiments can be implemented using a single instance of computing device 500, while in other embodiments multiple such systems, or multiple nodes making up computing device 500, can be configured to host different portions or instances of various embodiments. For example, in one embodiment some elements can be implemented via one or more nodes of computing device 500 that are distinct from those nodes implementing other elements. In another example, multiple nodes may implement computing device 500 in a distributed manner.

In different embodiments, computing device 500 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computing device 500 can be a uniprocessor system including one processor 510, or a multiprocessor system including several processors 510

(e.g., two, four, eight, or another suitable number). Processors 510 can be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 520. In other embodiments, program instructions and/or data can be received, sent or stored upon different types of computer-accessible media or on similar media separate from system memory 520 or computing device 500.

In one embodiment, I/O interface 530 can be configured to coordinate I/O traffic between processor 510, system memory 520, and any peripheral devices in the device, including network interface 540 or other peripheral interfaces, such as input/output devices 550. In some embodiments, I/O interface 530 can perform any necessary protocol, timing or other data transformations to convert data signals from one component (e.g., system memory 520) into a format suitable for use by another component (e.g., processor 510). In some embodiments, I/O interface 530 can include support for devices attached through various types of peripheral buses, such as a variant of the Peripheral Component Interconnect (PCI) bus standard or the Universal Serial Bus (USB) standard, for example. In some embodiments, the function of I/O interface 530 can be split into two or more separate components, such as a north bridge and a south bridge, for example. Also, in some embodiments some or all of the functionality of I/O interface 530, such as an interface to system memory 520, can be incorporated directly into processor 510.

Network interface 540 can be configured to allow data to be exchanged between computing device 500 and other devices attached to a network (e.g., network 590), such as one or more external systems or between nodes of computing device 500. In various embodiments, network 590 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 550 can, in some embodiments, include one or more display terminals, keyboards, keypads, touchpads, scanning devices, voice or optical recognition devices, or any other devices suitable for entering or accessing data by one or more computer systems. Multiple input/output devices 550 can be present in computer system or can be distributed on various nodes of computing device 500. In some embodiments, similar input/output devices can be separate from computing device 500 and can interact with one or more nodes of computing device 500 through a wired or wireless connection, such as over network interface 540.

In some embodiments, the illustrated computing device 500 can implement any of the operations and methods described above, such as the methods illustrated by the flowcharts of FIG. 2, FIG. 6 and FIG. 7. In other embodiments, different elements and data can be included.

Those skilled in the art will appreciate that computing device 500 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. Computing device 500 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from computing device 500 can be transmitted to computing device 500 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for zero-shot object detection, comprising:
   determining a background object bounding box having a respective background object class label in at least one image used to train a semantic embedding space;
   extracting features of the background object bounding box;
   extracting features of foreground object bounding boxes in the images used to train the semantic embedding space, the foreground object bounding boxes each having at least one respective foreground object class label;
   associatively embedding the extracted features of the foreground object bounding boxes and the at least one respective foreground object class label for each of the foreground object bounding boxes and the extracted features of the background object bounding box and the respective background object class label for the background object bounding box into the semantic embedding space having embedded therein pre-trained, foreground object class labels;
   determining at least one region of interest in an image having an unknown object class on which to perform an object detection as a proposed object bounding box;
   extracting features of the proposed object bounding box;
   projecting the extracted features of the proposed object bounding box into the semantic embedding space;
   computing a similarity measure between the projected features of the proposed object bounding box and the embedded features of at least one of the embedded foreground object bounding boxes and the embedded background object bounding box in the semantic embedding space; and
   predicting an object class label for the proposed object bounding box by determining at least one of a nearest foreground object class and a nearest background object class to the projected features of the proposed object bounding box in the semantic embedding space based on the similarity measure computed for the projected features of the proposed object bounding box.

2. The method of claim 1, wherein the background object bounding box comprises at least two background object bounding boxes having different features and a single vector representative of all of the different features of the at least two background object bounding boxes is embedded into the semantic embedding space.

3. The method of claim 1, wherein the pre-trained, foreground object class labels are embedded in the semantic embedding space using a word embedding technique.

4. The method of claim 1, wherein the proposed object bounding box is determined using an arbitrary region proposal method.

5. The method of claim 1, wherein features of the at least one proposed object bounding box are extracted using a convolutional neural network.

6. The method of claim 1, further comprising:
   determining a loss for an extracted feature of an object bounding box used to train the semantic embedding space.

7. The method of claim 6, further comprising:
determining an additional reconstruction loss to be added to the loss determined for the extracted feature of the object bounding box used to train the semantic embedding space.

* * * * *